April 7, 1970     H. P. WITTMAN ET AL     3,504,438
DENTAL APPARATUS AND METHODS INVENTORS
HAROLD P. WITTMAN
HARVEY WENICK
ANTHONY GIGLIOTTI
BY *Lackenbach & Siegel*
ATTORNEYS April 7, 1970   H. P. WITTMAN ET AL   3,504,438
DENTAL APPARATUS AND METHODS
Filed July 27, 1966   3 Sheets-Sheet 2
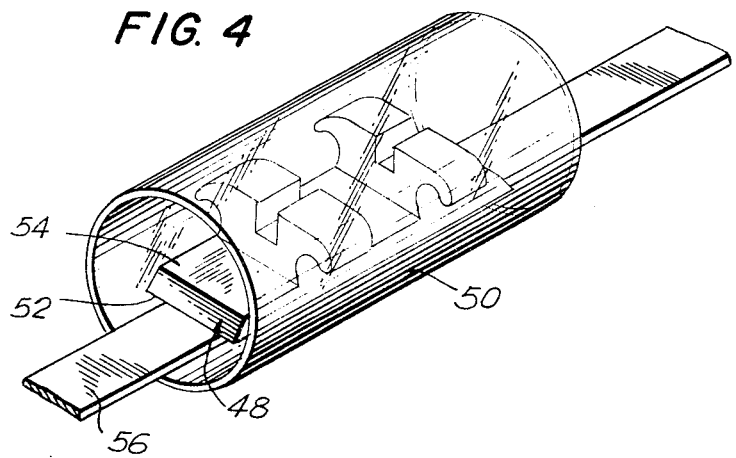
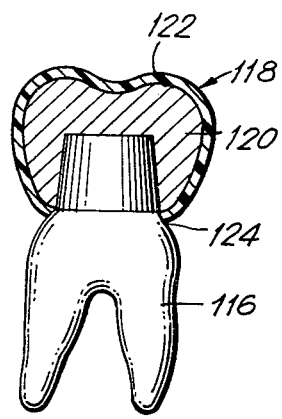
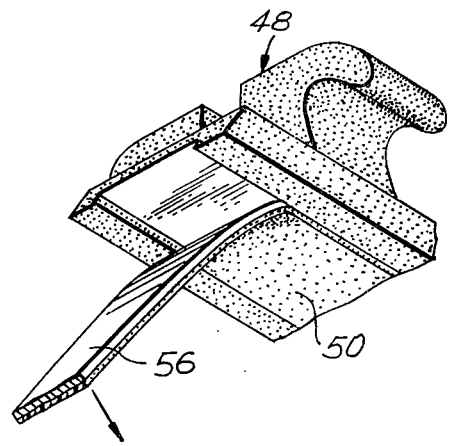
INVENTORS
HAROLD P. WITTMAN
HARVEY WENICK
ANTHONY GIGLIOTTI
BY
Lackenbach & Siegel
ATTORNEYS April 7, 1970 H. P. WITTMAN ET AL 3,504,438
DENTAL APPARATUS AND METHODS
Filed July 27, 1966 3 Sheets-Sheet 3

INVENTORS.
HAROLD P. WITTMAN
HARVEY WENICK
ANTHONY GIGLIOTTI

BY *Lackenbach & Siegel*

ATTORNEYS

United States Patent Office
3,504,438
Patented Apr. 7, 1970

3,504,438
DENTAL APPARATUS AND METHODS
Harold P. Wittman, Seminary Towers W. 22304, and Harvey Wenick, 901 N. Washington St. 22314, both of Alexandria, Va.; and Anthony Gigliotti, 7005 Andrews Ave., Philadelphia, Pa. 19138
Continuation-in-part of application Ser. No. 510,856, Dec. 1, 1965. This application July 27, 1966, Ser. No. 568,185
Int. Cl. A61c 7/00
U.S. Cl. 32—14
9 Claims

ABSTRACT OF THE DISCLOSURE

Dental fittings having a low friction exterior comprising, for example, a heat shrunk plastic film provided with a pull tab to enable ready stripping of a portion thereof to enable securement of the underlying apparatus utilizing conventional welding or adhesive bonding techniques.

---

This application is a continuation in part application of applicants' copending application Ser. No. 510,856 filed Dec. 1, 1965 and now abandoned, entitled Dental Device and Method of Making Same.

This invention relates to improved dental apparatus such as orthodontic and prosthetic apparatus for securement within the oral cavity and to improved methods of making and using such improved dental apparatus within the oral cavity.

More particularly, this invention relates to improved dental apparatus provided with a coating for enhanced aesthetic appeal, comfort, cleanliness, ease of securement, and, especially when utilized in connection with orthodontic apparatus, to enable more accurate transmittal of orthodontic forces to the teeth. Also, this invention more particularly relates to improved methods of making and using such coated dental apparatus.

The science of dentistry is of great importance in both physical and mental or emotional health. A full set of healthy, properly aligned and meeting teeth which are aesthetically appealing are necessary for both the physical well-being and the mental or emotional well-being of a person. Malformed, misaligned, or missing teeth can result in physical deterioration of the entire body because of, for example, improper eating habits and/or improper diet, including the inability to properly chew or masticate food. Other well known and lesser known impediments to physical well-being may result from bad teeth.. Mental or emotional health problems also may arise where the teeth are not aesthetically appealing, especially in children and young adults.

Accordingly, the science of dentistry is directed not only to the repair and removal of damaged teeth but also to providing prosthetic devices for missing or broken teeth and for correcting alignment, positioning, and malocclusion. The dental specialty directed towards clinical alignment, straightening and correction of malocclusion is called orthodontics.

Basically, the science of orthodontics includes physiologic, anatomic, psychologic and mechanical phases. The mechanical phase of orthodontics generally involves a mechanical process utilizing various mechanical appliances for applying forces to the teeth over a period of time to provide the proper alignment, positioning and to correct malocclusion. Such mechanical appliances may be either fixed, as by being cemented or tied in place in the mouth or may be removable. In the past, appliances of the above type, which may be referred to as orthodontic devices, and prosthetic devices for replacing missing or broken teeth have been made of various materals, such as steel and chrome alloys, precious metals such as gold and silver, rubber, ceramics such as porcelain and certain plastics. Orthodontic devices comprise, for example, bands, brackets, tubes, auxiliary attachments, wires, springs, etc. Prosthetic devices may comprise, for example, crowns, caps, bridges, etc.

Such orthodontic or prosthetic devices are normally cemented in place on the teeth for extended periods of time. As pointed out above, it is very important that such devices not only properly perform the physical or mechanical functions but also, that the devices be aesthetically appealing and psychologically suitable so as not to produce adverse effects on the mental, emotional and psychological health of the patient. This is especially true when such devices, and particularly when such orthodontic devices are utilized on a child or young adult. The conventional steel and chrome orthodontic devices presently in use are not aesthetically appealing and a child or young adult is often subjected to teasing and ridicule from his contemporaries when he wears such prior devices. This teasing and ridicule often has a severely adverse effect upon the mental, emotional and pyschological health of the young patient. Furthermore, such prior devices allow food particles to cling to the exposed portions of the teeth and therefore necessitates an exceptionally high degree of oral hygiene to minimize tooth decay. Prior orthodontic devices, also provided breeding areas therein for bacterial growth, both in the device and between the device and the teeth. Moreover, such prior art orthodontic devices have also displayed a high degree of friction between the device and adjacent teeth or between the device and devices secured with the adjacent teeth when orthodontic forces were applied thereto, thereby causing patient discomfort and interfering with the proper and accurate transmittal of the orthodontic forces to the teeth preventing efficient and independent mechanical alignment of the individual teeth. It has been suggested to improve the aesthetic appearance of orthodontic and prosthetic devices by coating the devices with porcelain and acrylic materials by bonding, or the like. Such prior art coated devices have not proved entirely satisfactory, either from the mechanical standpoint, or the psychologic standpoint.

Having in mind the foregoing disadvantages and considerations, and others that will be readily apparent to those skilled in the art, it will be understood that a primary object of the present invention is to provide dental apparatus which is coated to provide a pleasing aesthetic appearance thereto.

Another primary object of the present invention, in addition to the foregoing object, is to provide such coated dental apparatus which is resistant to bacterial attack, staining, and chemically inert.

It is further primary object of the present invention, in addition to each of the foregoing objects, to provide coated dental apparatus of the class described which may be easily secured with conventional cements to the teeth and which display a low coefficient of friction between the device and adjacent teeth or devices to enable accurate transmittal of orthodontic forces to the teeth.

It is yet another primary object of the present invention, in addition to the foregoing objects, to provide dental apparatus of the class described which are easy to clean, reduce bacterial attack upon the teeth, and which are strong, tough, abrasion resistant, relatively inexpensive and chemically inert.

It is a still further primary object of the present invention, in addition to each of the foregoing objects, to provide dental apparatus of the class described substantially free of sites conductive to bacterial growth.

It is a yet further primary object of the present invention, in addition to the foregoing objects, to provide dental apparatus of the class described capable of exhibiting external coloration which is similar to their surroundings when positioned in the mouth of a patient.

Another and yet still further primary object of the present invention, in addition to each of the foregoing objects, is to provide methods of coating dental apparatus.

Another and yet still further primary object of the present invention, in addition to each of the foregoing objects, is to provide novel methods of utilizing orthodontic devices to enable the accurate independent transmission of orthodontic forces to a patient's teeth.

The invention resides in the combination, construction, arrangement and disposition of the various component parts and elements incorporated in improved dental apparatus constructed in accordance with the principles of the present invention and in methods of making and utilizing such apparatus. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In accordance with the present invention, the porcelain and acrylic coating materials of the prior art are replaced by polytetrafluoroethylene (Teflon) or a material having similar properties thereto, such as fluorinated ethylene propylene (Teflon FEP), trifluochloroethylene, vinylidene fluoride, polyphenylene oxides, nylon, irradiated modified polyolefins and polycarbonates and other organic and inorganic polymeric materials. Also, instead of a metal building block covered by Teflon, or the like due to the strength of Teflon, the metal building block may be eliminated and the entire device formed from Teflon. The Teflon dental apparatus or Teflon coated apparatus has the properties listed in the following table, many of which are not found in the corresponding porcelain and acrylic counterparts.

|  | Teflon | Porcelain | Acrylic |
| --- | --- | --- | --- |
| Strength | Yes | No | No. |
| Bacterial resistant | Yes | Yes | No. |
| Moisture-proof | Yes | Yes | No. |
| Resists stains | Yes | Yes | No. |
| Dimensionably stable | Yes | Yes | Yes. |
| Colorability | Yes | Yes | Yes. |
| Heat resistant | Yes | Yes | Yes. |
| Non-conductor | Yes | Yes | Yes. |
| Acid-resistant | Yes | No | No. |
| Non-breakable | Yes | No | No. |
| Replaceable | Yes | Yes | Yes. |
| Easily manipulated | Yes | No | Yes. |
| Relatively inexpensive | Yes | Yes | Yes. |
| Chemically inert | Yes | Yes | Yes. |

In the drawing:

FIG. 4 is an isometric illustration showing one step in a method of coating an orthodontic device in accordance with the principles of the present invention;

FIG. 5 is an isometric illustration of the device of FIG. 4 illustrating another step in the coating of the device in accordance with the principles of the present invention;

FIG. 13 is a cross sectional elevational view of a dental device for use in prosthetics constructed in accordance with the principles of the present invention.

Figure 1:
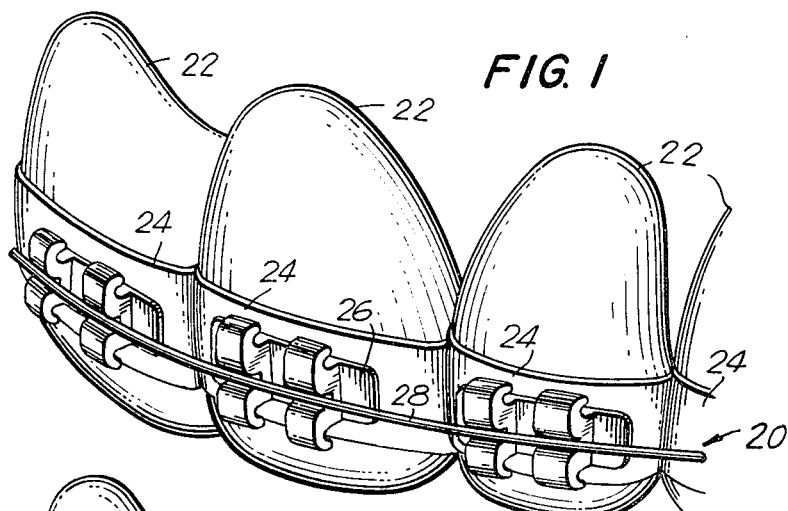
FIG. 1 is a pictorial representation of a group of teeth with a plurality of orthodontic devices.

With reference now to the drawing, and particularly to FIG. 1 thereof, there is shown and illustrated an orthodontic assembly, generally designated by the reference character 20 mounted upon teeth 22. The orthodontic assembly 20 comprises mounting means, such as bands 24 affixed to the teeth 22 in a conventional manner, as by means of a dental cement, or the like. The orthodontic assembly 20 further comprises attachment means, such as brackets 26 structurally associated with the mounting bands 24, as by welding, or the like. Stress applying means, such as a spring wire 28 applies orthodontic forces to the brackets 26, which in turn apply the forces to the bands 24 and the force is thereby applied to the teeth 22. As the mounting means 24, the attaching means 26 and the stress applying means 28 are conventionally fabricated of stainless steel or chrome alloys, or the like, it is readily apparent that the orthodontic assembly 20 exhibits a substantial visual contract to the enamelled surface of the teeth 22 and, therefore, the presence of the orthodontic assembly 20 within the oral cavity is immediately readily apparent. Not only is the presence of the orthodontic assembly 20 readily apparent, but the sharp contrast between the highly polished reflective metallic surface of the orthodontic assembly and the relatively dull, generally white surface of the teeth 22 is aesthetically objectionable. In the case of children and young adults, who comprise the vast majority of patients upon whom orthodontic assemblies are applied, this objectionable appearance, which may be coupled with ridicule, or the like from the young contemporaries of the patient can result in excessive self-consciousness and the attendant emotional and psychologic effects upon the patient.

Furthermore, the conventional metal orthodontic assembly 20, and the adjacent surfaces of the teeth 22 are very difficult to keep properly clean and stain-free. Food particles, or the like, are easily trapped or caught by the metal components of the orthodontic assembly and the various sharp edges and overlapping portions thereof provide unwanted breeding areas for bacterial growth which leads to extensive tooth decay and halitosis. Moreover, in addition to the desired direct forces applied by the spring tension of the stress applying means, various uncertain and undesired frictional forces are developed between the various components of the orthodontic assembly 20 and between the orthodontic assembly 20 and adjacent tooth surfaces. These frictional forces produce discomfort to the patient and interfere, counteract and distort the orthodontic forces desired to be applied.

Figure 2:
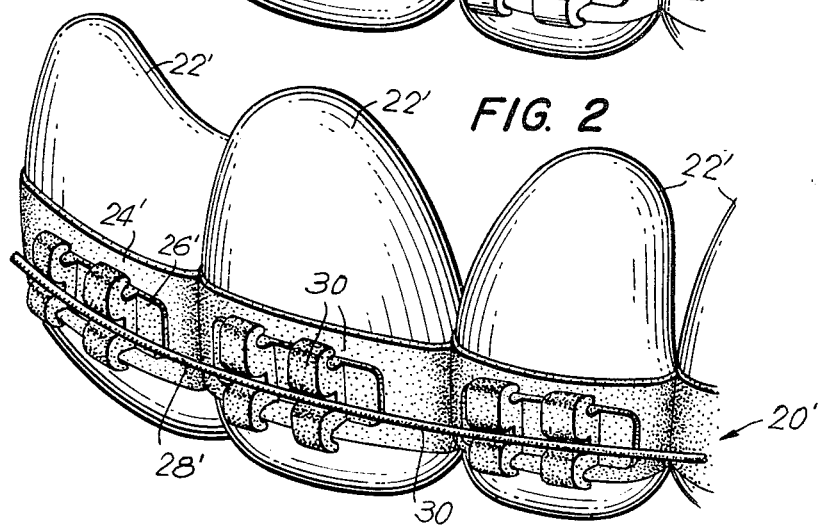
FIG. 2 is a pictorial representation similar to FIG. 1 showing the orthodontic devices coated in accordance with the principles of the present invention.

Referring now to FIG. 2 of the drawing, wherein like reference characters are used for like parts, the reference characters, however, being primed, an orthodontic assembly, generally indicated by the reference character 20' constructed in accordance with the present invention is shown structurally associated with teeth 22'. The mounting means 24', the attaching means 26' and the stress applying means 28', on all exposed surfaces thereof are coated or encased beneath a thin film of polytetrafluoroethylene (Teflon) or a material having the properties thereof, such as fluorinated ethylene propylene (Teflon FEP), trifluochloroethylene, vinylidene fluoride, polyphenylene oxides, nylon, irradiated modified polyolefins and polycarbonates and other organic and inorganic polymeric materials 30. The coating 30 is preferably mechanically locked thereon so that substantially no part of the apparatus 20 is exposed after coating. Of course, the interior of the mounting means 24' which must be secured with the teeth 22' as by means of a cement, or the like are left uncoated. The coating 30 displays a low coefficient of friction between adjacent mating portions thereof when orthodontic forces are applied to the assembly 20' and effectively reduce the incidence of bacterial growth. The coating 30 can also be colored in accordance with the surrounding body portion, such as the teeth 22' and is less conducive to staining and electrolytic attack, since the coating is chemically inert and an electrical insulator. The coating 30 further reduces the incidence of food, or the like clinging to the apparatus 20' and provides fillets at the various sharp junctures of the components of the assembly 20', tends to fill any voids between mating components of the assembly 20' and eliminates the sharp food and bacteria catching angles between the mounting means 24' and the adjacent surfaces of the teeth 22'. The surface appearance of the coating 30, in both coloration and texture can be matched to the appearance of the adjacent teeth 22' so that the coated orthodontic apparatus 20' will accordingly be more acceptable to the public, and, especially to children and other young patients. Instead of being coated with Teflon or the like, the various components of the orthodontic apparatus 20' could be formed entirely of Teflon, or the like.

The coating 30 may be applied to the various component parts of the assembly 20' individually, and the pre-coated component parts then assembled into operative association. The component parts of the assembly 20' can also be pre-assembled prior to the application of the coating 30 thereto.

Figure 3:
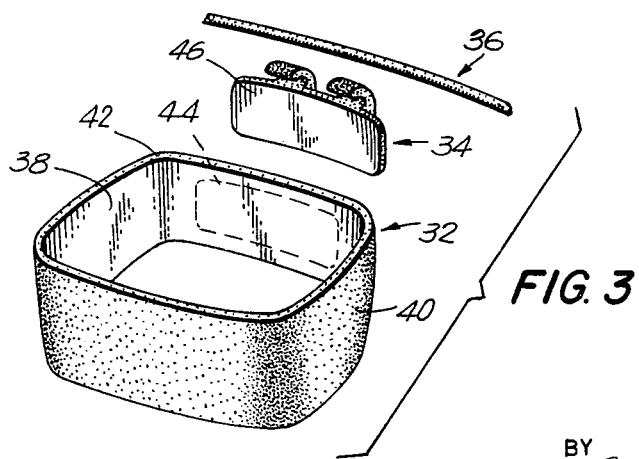
FIG. 3 is an exploded isometric illustration of an orthodontic assembly constructed in accordance with the principles of the present invention.

With reference now to FIG. 3 of the drawing the precoated lateral pre-formed band 32, a pre-coated twin edgewise bracket 34 and a pre-coated spring wire 36 are shown and illustrated prior to interassembly thereof. The lateral pre-formed band 32 is adapted for use by the orthodontist upon the upper laterals. The interior surface 38 is uncoated and may be surface treated in a conventional manner to enable cementing to the laterals by means of conventional dental cements. The exterior surface of the band 32, and preferably both the exterior side surfaces 40 and the upper and lower edge portions 42 are completely coated or encased within a thin layer of Teflon, or the like. Also, an area 44 on the external surface 40 is either left uncoated, or the Teflon coating is adapted to be removed therefrom to enable the bracket 34 to be readily secured to the band 32 as by welding. The bracket 34, which is illustrated as being a twin edgewise bracket similar to the brackets 26 and 26' is also pre-coated on all exposed surfaces thereof with a coating of Teflon, or the like. The inner flange surface 46, similarly to the area 44 on the band 32 preferably is either not coated during the coating of the twin edgewise bracket 34 or the coating extending over the inner flange surface 46 is adapted to be readily removable therefrom. Accordingly, the pre-coated band 32 and bracket 34 may be readily secured to one another, as by welding, or the like to provide an assembly which will be coated on all exterior exposed surfaces with Teflon, or the like. The spring wire 36 is also preferably coated entirely thereof by means of Teflon, or the like so that upon assembly in operative relationship with the bracket 34, the Teflon coatings of the wire 36 and the bracket 34 will so coact as to effectively preclude the formation of pockets, voids, or the like therebetween which pockets or voids could form sites for bacterial growth.

The Teflon coating may be applied to the various dental appliances by means of various well-known processes. It is preferable, however that whatever process is utilized, the resulting coating extends sufficiently about the appliance or device as to not only provide the desired exterior coating but that furthermore the coating be so mechanically positioned relative to the device or appliance that relative movement therebetween is precluded, that is, that the finished configuration of the Teflon coating be such relative to the appliance or device that a mechanical lock be formed therebetween. For example, the Teflon coating may be applied in the form of a liquid or a dispersion by dipping, spraying, brushing, or the like. The Teflon coating may also be applied as a pre-formed film which is mechanically joined with the appliance or device, as by adhesives, heat shrinking process, or the like.

With reference now particularly to FIG. 4 of the drawing, an orthodontic device, such as a twin edgewise bracket 48 may be inserted within a pre-formed and pre-stressed Teflon sleeve 50, the Teflon sleeve 50 having been previously subjected to stressing in a conventional manner which will enable the Teflon sleeve 50 to shrink into tight mechanical engagement with the bracket 48. The thickness and configuration of the Teflon sleeve 50 may be of any desired extent, depending upon the thickness of coating and the size of the bracket 48 desired. For example, it has been found that a thickness of approximately three mils is entirely satisfactory from all standpoints. Upon subjecting the Teflon sleeve 50 to heat of about two hundred to three hundred fifty degrees Fahrenheit, depending upon the material used, the Teflon will shrink tighly onto the bracket 48 resulting in the bracket 48 being completely enclosed and mechanically locked in a thin, tight-fitting Teflon coating. Any excess Teflon may be removed by means of grinding, filing or the like. As hereinbefore pointed out, it is preferable that the lower or attachment surface 52 of the flange 54 of a bracket 48 be not coated with the Teflon, or that the Teflon coating thereon be removed prior to assembly of the bracket 48 with the mounting band to enable the bracket 48 to be secured with the mounting band in a conventional manner, as by welding or the like. Accordingly, a thin tear strip 56 of steel, or the like may be advantageously encased within the Teflon sleeve 50 extending across the lower surface 52 of the flange 54 as an aid in stripping the desired portion of the Teflon coating away from the bracket 48. With the tear strip 56 so positioned, following heat shrinking of the Teflon sleeve 50 into tight mechanically locked fitting around the assembled bracket 48 and tear strip 56, the tear strip 56 may be readily utilized to effectuate the desired removable of the Teflon coating from the lower surface 52. Referring to FIG. 5 of the drawing, a simple pull applied to the tear strip 56 generally downwardly and away from the bracket 48 results in a severing and removal of the portion of the Teflon coating extending thereacross. If desired, a knife or other sharp instrument may be utilized to pre-weaken or cut the Teflon coating along the side edges of the tear strip 56. Such pre-weakening or scoring of the Teflon along the edge of the tear strip 56 by means of a knife, or the like is assisted by the presence of the tear strip 56 as the side edges thereof function as guide means for the knife. Similarly, the use of a tear strip as shown in FIGS. 4 and 5 is also of assistance in exposing the fastening surfaces when the orthodontic device or appliance is coated in any other manner, such as by spraying, dipping, painting, or the like.

Figure 6:
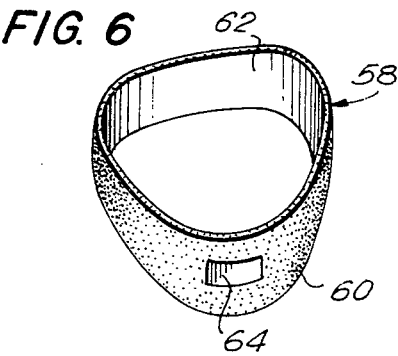
FIGS. 6 and 7 are isometric illustrations of dental devices for use in orthodontics constructed in accordance with the principles of the present invention.

With reference now to FIG. 6, there is shown an illustrated a bicuspid pre-formed band 58 coated with a thin tight-fitting mechanically locked coating of Teflon 60 according to the principles of the present invention. The coating 60 may be applied to the bicuspid band 58 in any convenient manner, as by heat shrinking, or the like and, as hereinbefore pointed out, the interior surface 62 thereof and a mounting area 64 on the exterior surface of the band 58 are preferably uncoated or exposed to enable conventional cementing of the band 58 with a bicuspid and conventional assembling of the band 58 with a bracket, or the like, as by welding. Obviously, the band 58 may be coated on the exterior surface thereof, while leaving the interior surface 62 uncoated simply and easily by spraying, brushing, or by heat shrinking of a Teflon sleeve thereon. However, it is sometimes simpler, as when it is desired to dip the band 58, to coat the entire band 58 and subsequently to the coating expose the interior surface 62. The use of a tear strip extending along the interior surface 62 enables the interior surface 62 to be exposed readily and easily without disturbing the mechanical locking of the coating 60 on the band 58. The welding area 64 may be likewise exposed subsequent to coating by means of a tear strip or the like or might be exposed by grinding, filling or the like of the coating 60.

Figure 7:
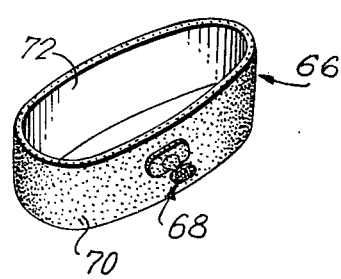

As hereinbefore pointed out, it is also within the principles of the present invention to assemble a complete orthodontic assembly prior to coating. With reference now to FIG. 7 of the drawing, an anterior pre-formed band 66 may be preassembled with another orthodontic device, such as a lingual button 68 prior to the application of a coating 70 according to the present invention. As was the case with the bicuspid pre-formed band 58, the coating 70 may be applied to the anterior pre-formed band 66 by spraying, dipping, heat shrinking, or the like. The interior surface 72 of the anterior pre-formed band 66 is likewise preferably uncoated to enable easy secure attachment of the band 66 with a tooth by means of a conventional dental cement.

Figure 8:
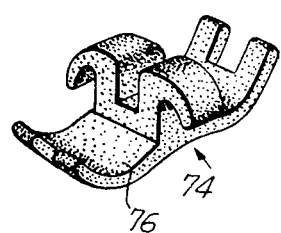
FIGS. 8 through 12 are isometric illustrations of additional dental devices for use in orthodontics constructed in accordance with the principles of the present invention.
Figure 9:
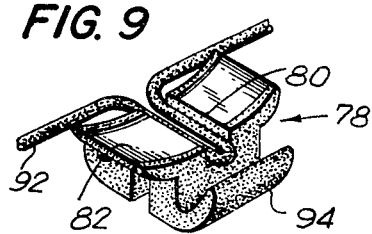
Figure 10:
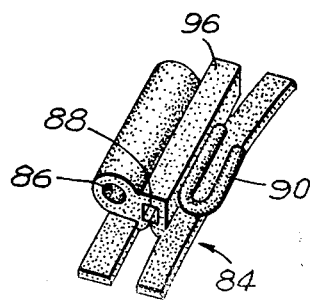

Referring now to FIGS. 8 through 10, additional examples of attachment means coated in accordance with the principles of the present invention are shown. In FIG. 8, a curved Lewis rotation bracket 74 is illustrated. The rotation bracket 74 is utilized in conjunction with a band such as the bicuspid preformed band 58 to provide twisting orthodontic forces to cuspids and bicuspids. The rotation bracket 74 is coated with a Teflon coating 76, or the like and may be coated prior to assembly with a band or might be assembled with the band prior to coating. Likewise, an edgewise bracket 78 provided with an auxiliary wire slot 80 extending generally vertically centrally of the mounting surface 82 is illustrated in FIG. 9. A combination buccal tube 84 provided with a plurality of generally longitudinally extending apertures 86 and 88 and a mesial hook 90 is illustrated in FIG. 10. The wire slot 80 of the edgewise bracket 78 and the apertures 86 and 88 of the buccal tube 84 are utilized to provide means for securing auxiliary spring wires, such as the tie wire 92 shown in FIG. 9, while the mesial hook 90 may be utilized as an attachment point for rubber or metal springs. Each of the edgewise brackets 78 and the combination buccal tube 84 are substantially entirely coated with coatings 94 and 96, respectively, of Teflon, or the like. Preferably, the interior of the wire slot 80 of the edgewise bracket 78 and the apertures 86 and 88 of the buccal tube 84 are entirely coated by the responsive coating layers 94 and 96. Furthermore, the tie wire 92 is also coated on the exterior surface thereof with a Teflon coating 98 so that upon assembly of the auxiliary spring wires with the brackets or tubes the Teflon coatings thereon will substantially completely fill the wire slot 80 and the apertures 86 and 88 preventing the formation of sites for bacterial growth within the wire slot 80 and the apertures 86 and 88. Each of the brackets 74, 78 and 84 may, of course, be coated either prior to or after the mounting thereof upon a band.

Figure 11:
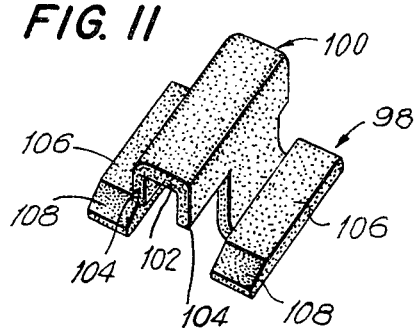
Figure 12:
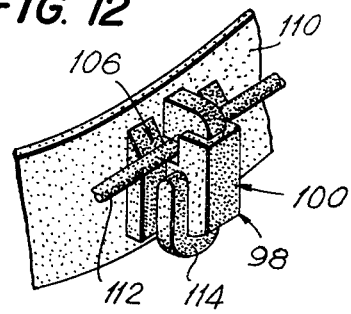

There is shown and illustrated in FIGS. 11 and 12 a light wire bracket comprising a central generally U-shaped channel portion 100 having a base 102 and a plurality of generally parallel legs 104 depending therefrom. A pair of gingival welding flanges 106 provided with levelled portions 108 project generally laterally outwardly from the sides 104. The bracket 98 is adapted for securement upon a band 110, or the like for securing therewith a spring wire 112. A wire lock pin 114 is adapted to engage the channel portion 100 to secure the spring wire 112 with the bracket 98. The bracket 98, the band 110, the spring wire 112 and the lock pin 114 may each be substantially completely coated by a Teflon, or the like coating, either prior to assembly thereof or following assembly thereof to substantially completely coat the entire assembly. As shown, the lock pin 114 is bent following insertion thereof into the channel portion 100 and accordingly, the Teflon coating is preferably sufficiently flexible to enable such bending without fracturing of the coating.

As hereinbefore pointed out, the present invention pertains not only to orthodontic dental devices but also to prosthetic dental devices. Accordingly, and with reference now to FIG. 13, there is shown and illustrated a tooth 116 prepared to receive a prosthetic dental device, such as a restoration or crown 118. The crown 118 comprises a core 120 which may, for example, be fabricated of gold or other precious metal in a conventional manner and secured with the tooth 116 by means of a dental cement, or the like. The core 120 of the crown 118 is preferably, according to the present invention, enclosed, encased and covered by means of a thin layer 122 fabricated of Teflon, or the like, which may be applied to the core 120 in any convenient manner. The thickness of the Teflon layer 122 can be varied as desired but it has been found that a thickness of about three mils, as described hereinabove, is suitable. The Teflon layer 122 may be applied to the core 120 by dipping, spraying, heat shrinking, or the like as described hereinabove. Preferably, the Teflon layer 122 extends completely around the exposed surfaces of the core 120, sealingly tightly engaging the periphery of the tooth 116 at the juncture 124 therewith and to provide a firm, tight-fitting mechanically locked relationship upon the core 120. If desired, the Teflon layer 122 may be of substantially any desired thickness, up to and including forming the crown or restoration 118 entirely of Teflon and securing the crown or restoration 118 with the tooth 116 by means of a cement or adhesive capable of bonding with the Teflon and with the tooth. Also, a thin metal cap might be utilized within a crown or restoration formed substantially entirely of Teflon eliminating the necessity of forming the metal to the configuration of the restoration while retaining the ability to bond the Teflon restoration with the tooth 116 by means of conventional dental cements.

Similarly, each of the previously discussed orthodontic devices could be formed entirely, or substantially entirely of Teflon, or the like securing the orthodontic appliances with the teeth by means of a cement or adhesive which will bond with the Teflon and with the teeth.

In each instance, however, the Teflon coating is preferably so configured as to provide a firm tight-fitting, mechanically locked coating upon the underlying device, appliance, or apparatus substantially entirely covering the exposed external surfaces thereof to provide a surface which may be easily cleaned, is chemically inert, provides low friction characteristics, prevents food particles, or the like, from clinging to the device, apparatus, or appliance which further aids in preventing bacterial growth and provides an aesthetically appealing surface which may be colored similarly to the surrounding tissue and/or teeth. Such dental devices coated with Teflon, or the like, will accordingly be more acceptable to the public, and especially to children or other young adult patients to aid in the psychologic, emotional and mental aspects of the science of dentistry and furthermore to aid and assist in the mechanical phases of dental science.

What is claimed is:

1. An orthodontic appliance comprising a base material and an exterior surface defined by a polymeric material characterized by low friction and aesthetic appeal, said coating being mechanically locked upon and with respect to said material, said coating having a removable portion enabling a pull thereupon to remove said removable portion from said base material to expose a portion of said base material to permit conventional assembly and securement of said appliance to another orthodontic appliance or to a tooth at the exposed portion of said base material.

2. An orthodontic appliance as set forth in claim 1 wherein said exterior surface comprises a material selected from the group consisting of polytetrafluorethylene, trifluochlorethylene, vinylidene, fluoride, polyphonylene oxides, nylon, irradiated modified polyolefins and polycarbonates.

3. An orthodontic appliance as defined in claim 1 wherein said outer surface comprises polytetrafluorethylene.

4. An orthodontic appliance as defined in claim 1 comprising dental attachment means adapted for securement, as by welding, with orthodontic mounting means.

5. An orthodontic appliance as defined in claim 4 wherein said coating is applied to each of said attachment means and said mounting means prior to the assembly thereof.

6. An orthodontic appliance as defined in claim 5 wherein each of said coating layers on said attachment means and said mounting means are provided with strippable areas to enable the coating to be readily and easily removable therefrom to permit conventional assembly and securement therebetween.

7. An orthodontic appliance defined in claim 1 wherein said coating comprises a thin layer of material having plastic memory which has been previously expanded to enable insertion of said base material therein and then heated to shrink said layer into firm intimate engagement with said base material.

8. An orthodontic appliance comprising a base material and an exterior surface defined by a polymeric material characterized by low friction and aesthetic appeal, said coating being mechanically locked upon and with respect to said material, further comprising a pull tab disposed between said base material and said coating to define a strippable area on said coating and extending generally outwardly thereof enabling a pull on said pull tab to strip said strippable area of said coating away from said base material to expose a portion of said base material to permit conventional assembly and securement of said appliance to another orthodontic appliance or to a tooth at the exposed portion of said base material.

9. An orthodontic appliance defined in claim 8 wherein said coating comprises a thin layer of material having plastic memory which has been previously expanded to enable insertion of said base material therein and then heated to shrink said layer into firm intimate engagement with said base material.

References Cited

UNITED STATES PATENTS

| | | |
|---|---|---|
| 3,095,103 | 6/1963 | Harrison. |
| 2,479,780 | 8/1949 | Remensnyder. |
| 3,052,983 | 9/1962 | Weinstein. |
| 3,250,003 | 5/1966 | Collito. |
| 3,303,565 | 2/1967 | Newman. |

FOREIGN PATENTS

| | | |
|---|---|---|
| 1,120,779 | 7/1956 | France. |

OTHER REFERENCES

New Design Data for Teflon, Machine Design, January–February 1960 (pp. 16–18, 20 and 22 relied upon).

Newer Uses and Limitations of Acrylic Resins, Tylman, Journal A.D.A., vol. 29, pp. 1726–27, September 1942.

ROBERT PESHOCK, Primary Examiner